(12) United States Patent
Lauk et al.

(10) Patent No.: US 6,376,962 B1
(45) Date of Patent: Apr. 23, 2002

(54) ELECTRIC DRIVE UNIT FOR VEHICLE SYSTEMS

(75) Inventors: Detlef Lauk, Renchen; Ernst Fischer, Gernsbach; Hansjoerg Karcher, Buehlertal; Juergen Herp, Buehl; Erik Maurer, Buehlertal; Andreas Wiegert, Kappelrodeck; Bernd Bock, Ochsenhausen; Richard Hurst, Offenburg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/601,995

(22) PCT Filed: Jun. 26, 1999

(86) PCT No.: PCT/DE99/01873

§ 371 Date: Oct. 3, 2000

§ 102(e) Date: Oct. 3, 2000

(87) PCT Pub. No.: WO00/36728

PCT Pub. Date: Jun. 22, 2000

(30) Foreign Application Priority Data

Dec. 17, 1998 (DE) .......................................... 198 58 231

(51) Int. Cl.⁷ .......................... H02K 13/00; H02K 13/10

(52) U.S. Cl. ......................... 310/239; 310/242; 310/244
(58) Field of Search ................................ 310/239, 242, 310/244, 248, 249, DIG. 6

(56) References Cited

U.S. PATENT DOCUMENTS

| 4,404,488 A | * | 9/1983 | Herr .......................... 310/239 |
| 4,572,979 A | * | 2/1986 | Haar et al. ................. 310/68 R |
| 5,563,462 A | * | 10/1996 | Strobl et al. .................. 310/71 |
| 5,814,915 A | * | 9/1998 | Wang ......................... 310/242 |
| 6,051,899 A | * | 4/2000 | Walther et al. ............... 310/71 |

* cited by examiner

Primary Examiner—Nestor Ramirez
Assistant Examiner—Dang Dinh Le
(74) Attorney, Agent, or Firm—Ronald E. Greigg

(57) ABSTRACT

An electric drive unit for vehicle systems, such as power windows and windshield wipers, having a commutator motor that has a commutator and at least two commutator brushes. The electric drive unit includes electrical components of an electronic system for the motor. To reduce production costs and simplify assembly, the electrical components are electrically secured to a lead frame that makes the electrical connection between the components and the commutator motor and the commutator brushes are embodied as hammerhead brushes, whose carrier plates are bent in one piece out of the lead frame.

9 Claims, 3 Drawing Sheets

ELECTRIC DRIVE UNIT FOR VEHICLE SYSTEMS

PRIOR ART

The invention is based on an electric drive unit for vehicle systems, such as power windows and windshield wipers.

A known electric drive unit for power windows in motor vehicles (German Utility Model DE 90 13 006 U1) has a gear housing, adjoining the end toward the commutator of the commutator motor. The commutator motor has a lengthened motor shaft, in the form of a gear drive shaft (worm shaft) which protrudes into the gear housing. A printed circuit board electrically connected to an external connecting plug and commutator brushes and to components of an electronic system for the motor is disposed in an electronics housing. The printed circuit board has a one-piece receiving part for the brush mount and a one-piece receiving part for the connecting plug. The electrical terminals of the components, brushes and connecting plug are bonded, to make electrical contact, to the conductor tracks of the printed circuit board. The brushes are disposed diametrically on the commutator and are each retained radially displaceably in a quiver formed in the brush mount. The electronics housing is a component of the gear housing and is closed by an electronics housing cap that is integral with the gear housing cap.

From German Patent Disclosure DE 44 30 798 A1, a lead frame is known that is made of metal strips that serve as conductor tracks for connecting electrical components. The electrical components are mounted on the lead frame, and their terminal leads are welded or soldered to the lead frame. As an example of possible components, integrated circuits, sensors, resistors, capacitors, and so forth can be used. The lead frame with components mounted on the lead frame is spray-coated with plastic.

ADVANTAGES OF THE INVENTION

The electric drive unit for vehicle systems has an advantage that all the electrical components and current-carrying connections are concentrated on a lead frame that is standardized for each motor type, that assures good handling, and that has defined interfaces with the basic plug. The commutator brushes, embodied as hammerhead brushes, are an integral component of the lead frame and need not be mounted and wired separately. The expense of assembling and installing the brushes is dispensed with. At the same time, the carrier plates of the hammerhead brushes furnish the brush contact pressure forces on the commutator. The delivery of the carbon brush is done from the back side of the carrier plates, facing away from the commutator. The unit part formed by the lead frame with components and commutator brushes can be automatically manufactured, easily assembled automatically welded, and easily installed.

BRIEF DESCRIPTION OF THE DRAWINGS

The invention is described in further detail below in terms of an exemplary embodiment shown in the drawing. Shown, in each case schematically, are.

DESCRIPTION OF THE EXEMPLARY EMBODIMENT

Figure 1:
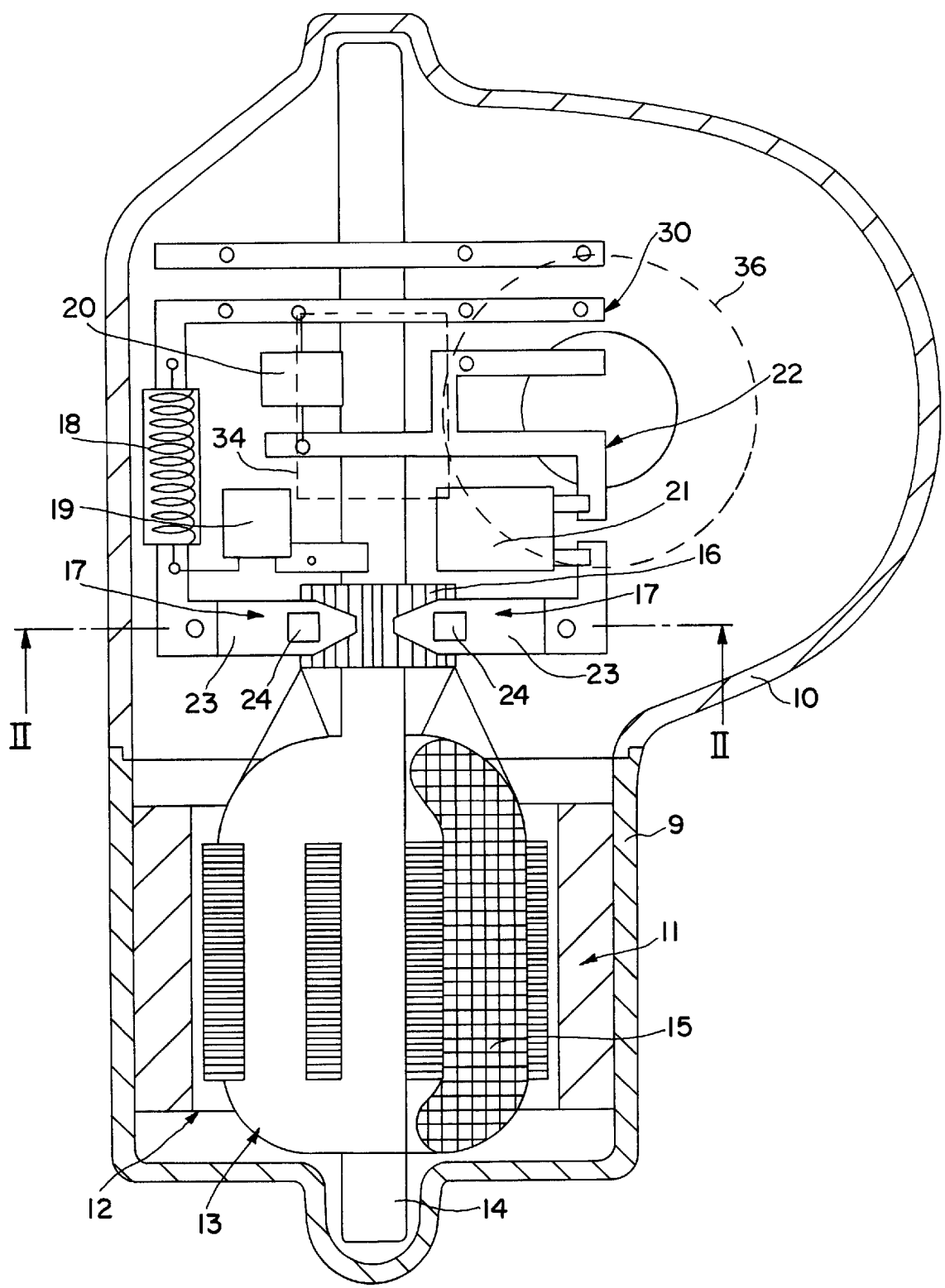
FIG. 1, a longitudinal section through an electric drive unit for a windshield wiper in motor vehicles.
Figure 2:
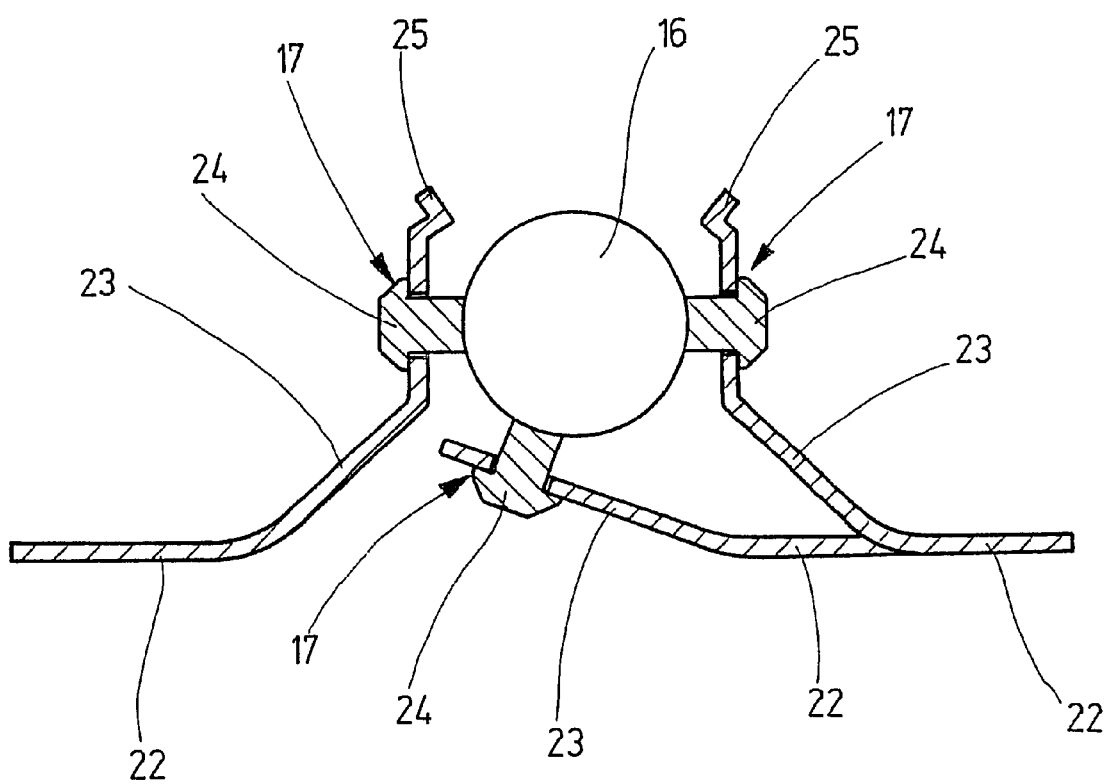
FIG. 2, a section taken along the line II—II of FIG. 1
Figure 3:
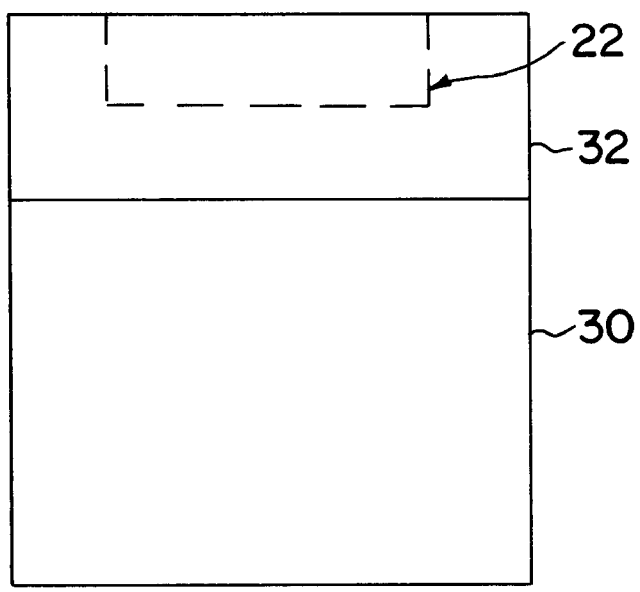
FIGS. 3 and 4 illustrates schematic drawings illustrating a lower housing part and a housing cap.
Figure 4:
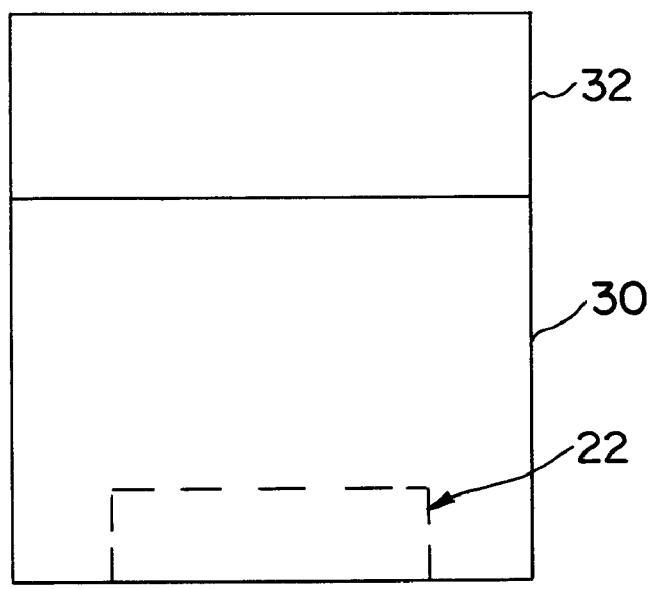

The electric drive unit, shown in longitudinal section in FIG. 1, for a windshield wiper in motor vehicles, as an exemplary embodiment of a vehicle system of some general kind, has a motor housing 9 and a two-piece gear housing 10, mounted on the motor housing, that comprises a lower 30 housing part and a housing cap 32, as shown in FIGS. 3 and 4. A commutator motor 11 with a stator 12 and rotor 13 is received in the motor housing 9, and its lengthened rotor shaft 14 that carries the rotor 13 protrudes, as a worm gear 34 on the drive shaft which drives a worm gear wheel 36, in the gear housing 10. A rotor winding 15 received in the rotor 13 is electrically conductively connected to the commutator laminations of a commutator 16 that is seated on the rotor shaft 14 in a manner fixed against relative rotation. Carbon brushes 24 of three commutator brushes 17 (FIG. 2) are pressed with radial contact pressure against the circumference of the commutator 16 and are connected to an electrical connecting plug, not shown here.

The drive unit further includes electrical components of an electronic system for the motor, such as an interference suppression choke 18, an interference suppression capacitor 19, a diode 20, a bimetal or thermal switch 21, and optionally resistors, not shown here. All of these electrical components 18–21 are secured electrically to a framework 22 of electrically conductive material, which makes the electrical connections among the various components and the commutator motor 11 and commutator brushes 17. The framework 22 is integrated with the gear housing 10 and in this exemplary embodiment FIG. 3 is placed in the housing cap 32 and secured to the housing cap by ultrasound welding or hot caulking of position pegs intended for this purpose. The framework 22 can also be solidly joined in the same way to the lower housing part 30, FIG. 4, which is likewise of plastic. The electrical and mechanical connection of the components 18–21 to the framework 22 is done by welding the leads, protruding from the components 18–21, onto the metal struts of the framework 22, which can be done for instance by laser welding. The electrical system includes a terminal position switch 30 such as set forth in FIG. 1. The terminal position switch is well known in the prior art and is shown in FIG. 2, reference character 54 in U.S. Pat. No. 4,572,979 to Haar et al.

As can be seen particularly from the sectional view in FIG. 2, the commutator brushes 17 are embodied as so-called hammerhead brushes, in each of which a carbon brush 24 is retained by a spring lever or carrier plate 23, which at the same time exerts the radial contact pressure for the carbon brush 24 onto the commutator 16. Each carrier plate 23 is bent integrally as a part of the framework 22, and the carbon brushes 24 are inserted into suitable recesses in the carrier plates 23 from the back side of the carrier plates 23, remote from the commutator 16, and fixed so as to be axially nondisplaceable, for instance by means of tabs, not shown. The total of three commutator brushes 17, all of them embodied in the same way as hammerhead brushes, make it possible to operate the commutator 11 at two rpm levels. To facilitate installation, on each of the free ends of the carrier plates 23 of the two diametrically opposed commutator brushes 17 there is a respective joining aid 25, in the form of a guide projection, bent at an angle and protruding toward the commutator 16. When the housing cap is put in place, these joining aids 25 slide along the commutator 16 and thus make it easier to slip the commutator brushes 17 on the carrier plates.

As a rule, the drive unit, designed for a windshield wiper, also has a terminal position switch for turning off the commutator motor 11 in the so-called parking position of the windshield wiper. The terminal position switch 30, is realized in the form of a wiper contact, which in the parking position of the windshield wiper interrupts the delivery of current to the commutator motor. The wiper contact spring that cooperates with the wiper contact is then likewise bent integrally as a part of the framework 22.

The foregoing relates to a preferred exemplary embodiment of the invention, it being understood that other variants and embodiments thereof are possible within the spirit and scope of the invention, the latter being defined by the appended claims.

What is claimed is:

1. An electric drive unit for vehicle systems, comprising a commutator motor (11) that has a commutator (16) and at least two commutator brushes (17), and electrical components (18–21) of an electronic system for the motor, in which the electrical components (18–21) are electrically connected to an electrically conductive framework (22) that makes the electrical connection between the components (18–21) and the commutator motor (11), and that the commutator brushes (17) are embodied as hammerhead brushes carried by carrier plates (23) which are bent and formed in one piece out of the electrically conductive framework (22).

2. The drive unit of claim 1, further comprising a gear, disposed downstream of the rotor shaft (14) of the commutator motor (11) in which the gear is received in a gear housing (10), the electrically conductive framework (22) is equipped with the components (18–21) and is integrated with the gear housing (10).

3. The drive unit of claim 2, in which the gear housing (10) is made from plastic and is in two parts, the gear housing comprises a lower housing part and a housing cap, and that the electrically conductive framework (22) is placed in the lower housing part or the housing cap and securely joined thereto.

4. The drive unit of claim 3, in which the joining of the electrically conductive framework (22) and the lower housing part or housing cap is done by ultrasound welding or hot caulking of positioning pegs formed onto the gear housing (10).

5. The drive unit of claim 4, in which a joining aid (25) for sliding the hammerhead brushes (17) onto the commutator (16) is embodied on each of the carrier plates (23) of the electrically conductive framework (22).

6. The drive unit of claim 3, in which a joining aid (25) for sliding the hammerhead brushes (17) onto the commutator (16) is embodied on each of the carrier plates (23) of the electrically conductive framework (22).

7. The drive unit of claim 2, in which a joining aid (25) for sliding the hammerhead brushes (17) onto the commutator (16) is embodied on each of the carrier plates (23) of the electrically conductive framework (22).

8. The drive unit of claim 1, in which a joining aid (25) for sliding the hammerhead brushes (17) onto the commutator (16) is embodied on each of the carrier plates (23) of the electrically conductive framework (22).

9. The drive unit of claim 1, further comprising a terminal position switch for turning off the commutator motor (11) in a defined terminal position of the vehicle system, in which the terminal position switch has a wiper contact spring, which is bent in one piece out of the electrically conductive framework (22).

* * * * *

UNITED STATES PATENT AND TRADEMARK OFFICE
CERTIFICATE OF CORRECTION

PATENT NO. : 6,376,962 B1
DATED : April 23, 2002
INVENTOR(S) : Detlef Lauk et al.

It is certified that error appears in the above-identified patent and that said Letters Patent is hereby corrected as shown below:

<u>Title page,</u>
Item [86], should read as follows:

-- [86] PCT/DE 99/01873
371 Date: October 13, 2000
102(e) Date: October 13, 2000

Signed and Sealed this

Third Day of September, 2002

Attest:

JAMES E. ROGAN
Attesting Officer    Director of the United States Patent and Trademark Office